United States Patent [19]

Kawai et al.

[11] Patent Number: 4,510,079

[45] Date of Patent: Apr. 9, 1985

[54] ELECTRICALLY-CONDUCTIVE RESIN COMPOSITION

[75] Inventors: Yoichi Kawai; Yoshihisa Gotoh; Sachio Yokote, all of Yokohama; Marami Maki, Kawasaki; Kalsumi Sekiguchi, Yokohama, all of Japan

[73] Assignee: Mitsui Toatsu Chemicals, Inc., Japan

[21] Appl. No.: 366,208

[22] Filed: Apr. 7, 1982

[30] Foreign Application Priority Data

Apr. 13, 1981 [JP] Japan .................................. 56-54340

[51] Int. Cl.$^3$ ............................................. H01B 1/06
[52] U.S. Cl. .................................... 252/511; 524/377; 524/484; 252/502; 252/510
[58] Field of Search ........................ 252/511, 502, 510; 524/377, 80, 250, 392, 495, 496, 386, 387, 474, 484, 481; 525/343, 383, 384

[56] References Cited

U.S. PATENT DOCUMENTS

| | | | |
|---|---|---|---|
| 3,808,177 | 4/1974 | Thaler et al. | 525/349 |
| 3,816,358 | 6/1974 | Nordsiek et al. | 523/349 |
| 3,852,251 | 12/1974 | Mapley | 525/349 |
| 4,157,320 | 6/1979 | Yankner et al. | 524/377 |
| 4,199,491 | 4/1980 | Inayoshi et al. | 524/377 |
| 4,278,510 | 7/1981 | Chien et al. | 524/584 |

Primary Examiner—Josephine L. Barr
Attorney, Agent, or Firm—McGlew and Tuttle

[57] ABSTRACT

An electrically-conductive polyolefin resin composition having excellent resin flow properties which comprises (a) a polyolefin resin, (b) sulfur, (c) a plate adhesion promoter, (d) an electrically-conductive carbon black, and (e) a flow improver.

2 Claims, No Drawings

ELECTRICALLY-CONDUCTIVE RESIN COMPOSITION

BACKGROUND OF THE INVENTION

(1) Field of the Invention

This invention relates to an improved electrically-conductive polyolefin resin composition which can receive direct electroplating to exhibit excellent plate adhesion properties.

(2) Description of the Prior Art

Conventionally, a number of polyolefin resin compositions capable of direct electroplating are well known. One example of such resin compositions is disclosed in Japanese Patent Liad-Open No. 60349/'79. This resin composition comprises, in addition to a polyolefin resin, 25–41% of an electrically-conductive carbon black, 0.15–1.5% of sulfur, 0–7% of zinc oxide, and 0.2–1.5% of mercaptobenzothiazole or mercaptobenzothiazyl disulfide, and is commercially available from Alloy Polymers Co., Inc. under the trade name of Caprez DPP. Another resin composition, which is disclosed in Japanese Patent Laid-Open Nos. 58235/'80, 58236/'80, and 58237/'80, comprises a polyolefin resin, an oxide of a metal of group II in the periodic table, sulfur, a vulcanization accelerator, and an electrically-conductive carbon black. However, these resin compositions exhibit such poor flow properties during molding that small-sized articles cannot be made by multiple molding, a large gate is required for the molding of medium-sized articles, and large-sized thin-wall articles suitable for practical use cannot be molded because of the ensuing poor surface conditions. Thus, the electrically-conductive resin compositions known in the prior art have the disadvantage that their freedom of product design is significantly restricted by consideration of their resin flow properties.

On the other hand, it is well known that softening agents derived from petroleum and polyalkylene glycols (such as polyethylene glycol and the like) are being used as flow improvers in some fields of the rubber and resin industry. However, it has been believed in the polyolefin resin art that, if such a flow improver is added to a resin composition for use as in substrates to be plated, the flow improver will bleed on the surface of the molded articles made thereof and thus impair the adhesion properties of the plate formed thereon.

Prior to this invention, the present inventors found that specific thiuram disulfide compounds are effective plate adhesion promoters for olefin polymers containing carbon black and sulfur, and provided resin compositions containing such compounds. In addition, the present inventors have now found that the addition of a flow improver to these resin compositions can significantly improve their molding flow properties without impairing the plate adhesion properties, and that the flow improver remains effective even when a wide variety of other plate adhesion promoters are used. The present invention has been completed on the basis of this discovery.

SUMMARY OF THE INVENTION

It is an object of the present invention to provide an electrically-conductive resin composition which exhibits plate adhesion properties equal to those of prior art resin compositions of direct electroplating grade and which, in contrast to prior art electrically-conductive resin compositions, enables molding of large-sized thin-wall articles and multiple molding of small-sized articles.

The above and other objects are attained by this invention: in an electrically-conductive resin composition comprising (a) a polyolefin resin, (b) sulfur, (c) a plate adhesion promoter, and (d) an electrically-conductive carbon black, the improvement which comprises adding a flow improver to the composition in an amount of 4 to 40 parts by weight per 100 parts by weight of the combination of the polyolefin resin and the electrically-conductive carbon black, the flow improver being selected from the group consisting of softening agents derived from petroleum, polyalkylene glycols having alkylene radicals of 1 to 4 carbon atoms, and mixtures thereof.

DETAILED DESCRIPTION OF THE PREFERRED EMBODIMENTS

The polyolefin resins which can be used in the present invention include, for example, homopolymers of ethylene or propylene, copolymers of ethylene and propylene, copolymers of ethylene and/or propylene with other α-olefins, and the like. Any of the polyolefin resins that have been used in prior art resin compositions, for example, of direct electroplating grade can be used in the present invention.

The sulfur used in the present invention can be any of the sulfur materials that are commonly used as vulcanizing agents in the field of rubber industry. The sulfur is added in an amount of 0.1 to 10 parts by weight, preferably 0.5 to 5 parts by weight, per 100 parts by weight of the polyolefin resin. If the amount of sulfur added is less than 0.1 part by weight or greater than 10 parts by weight, the adhesion properties of the resulting plate are degraded.

The term "plate adhesion promoter" as used herein denotes any substance that can enhance the adhesion between a substrate to be plated and a metal film formed thereon. The plate adhesion promoters which are useful in the practice of the present invention include, for example, those compounds which are being used as vulcanization accelerators in the field of rubber industry; trithiolcyanuric acid and thiophenol derivatives, the effectiveness of which were discovered by the present inventors; and the like.

Typical examples of the vulcanization accelerators which can be used in the present invention are thiazole derivatives such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt, etc.; sulfenamides such as cyclohexylbenzothiazylfenamide, N-oxydiethylenebenzothiazyl-2-sulfenamide, N-tert-butyl-2-benzothiazole sulfenamide, N,N-diisopropyl-2-benzothiazole sulfenamide, dicyclohexylbenzothiazylsulfenamide, 2-(4-morpholinyl-dithio)benzothiazole, 2-(2,6-dimethyl-4-morpholinothio)benzothiazole, etc.; guanidine derivatives such as diphenylguanidine, triphenylguanidine, etc.; aldehyde ammonias such as acetaldehyde ammonia hexamethylenetetramine, etc.; aldehyde amines such as reactants of acetaldehyde and aniline, condensation products of n-butyraldehyde and aniline, etc.; thiourea derivatives such as thiocarbanilide, trimethylthiourea, ethylenethiourea, diethylthiourea, di-n-butylthiourea, di-n-laurylthiourea, etc.; thioic acid salts such as zinc butyl xanthate, zinc isopropyl xanthate, etc.; dithioic acid salts such as zinc dimethyldithiocarbamate, zinc diethyldithiocarbamate, zinc di-n-butyldithiocarbamate, zinc ethylphenyldithiocarbamate, sodium dimethyldithiocarbamate, sodium diethyldithiocarbamate, sodium di-n-butyldithiocarbamate, cadmium diethyldithiocarbamate, ferric dimethyldithiocarbamate, etc.; and the like.

Typical examples of the thiophenol derivatives which can be used in the present invention are 2,3,5,6-tetrachlorobenzenethiol, 2,3,5,6-tetrabromobenzenethiol, pentachlorobenzenethiol, pentabromobenzenethiol, 3,4,5,6-tetrachlorobenzene-1,2-dithiol, 3,4,5,6-tetrabromobenzene-1,2-dithiol, 4-chlorobenzene-1,2-dithiol, 4-bromobenzene-1,2-dithiol, benzene-1,2-dithiol, 4-methylbenzene-1,2-dithiol, 3,4,5,6-tetrametylbenzene-1,2-dithiol, and the like.

The above-defined plate adhesion promoter is added in an amount of 0.05 to 10 parts by weight, preferably 0.1 to 5 parts by weight, per 100 parts by weight of the polyolefin resin. If the amount of plate adhesion promoter added is less than 0.05 part by weight, the adhesion properties of the resulting plate are degraded to such an extent as to be unsuitable for practical purposes, while if it is greater than 10 parts by weight, no further improvement in adhesion properties is produced.

The electrically-conductive carbon black used in the present invention can be any of the carbon blacks that have been used in prior art resin compositions of direct electroplating grade. However, acetylene black, lamp black, high-structure furnace black, and graphite having well-developed structure are preferred. The electrically-conductive carbon black is added in an amount of 10 to 70 parts by weight per 100 parts by weight of the polyolefin resin, the amount being generally determined so as to impart an electric resistance of not higher than $10^3\omega$, preferably not higher than $300\omega$, to the resulting electrically-conductive resin composition. If the amount of carbon black added is greater than 70 parts by weight, the resulting resin composition is so hard that it exhibits poor rheological properties at molding temperature, while if it is less than 10 parts by weight, the resulting resin composition tends to have an excessively high electric resistance.

The term "flow improver" as used herein denotes any substance that is added to the resin composition for the purpose of improving its flow properties during molding. The flow improvers which are useful in the practice of the present invention include polyalkylene glycols having alkylene radicals of 1 to 4 carbon atoms, and softening agents derived from petroleum. These flow improvers exist in a nearly liquid state within the extruder for mixing the resin composition and within the molding machine (for example, injection molding machine, extruder or the like) for forming the resin composition into a desired shape, and thereby serve to improve the flow properties of the resin composition.

As the aforesaid polyalkylene glycols having alkylene radicals of 1 to 4 carbon atoms, polyethylene glycol, polypropylene glycol and the like can be used alone or in admixture.

As the aforesaid softening agents derived from petroleum, a variety of softening agents which are used in the field of rubber industry for the purpose of improving the processability of natural and synthetic rubbers during mastication, milling and other operations can be used as such. These softening agents include, for example, lubricating oils, process oils, paraffin, liquid paraffin, vaseline, ozokerite, ceresin, gilsonite, petroleum asphalt, mineral rubber, petroleum resin, and the like.

Among others, lubricating oils, process oils, and liquid paraffin are preferably used in the present invention.

Lubricating oils are generally divided into spindle oil and cylinder oil. Although either of them can be used in the present invention, spindle oil is preferred because of its low degree of contamination. Process oils which comprise high-boiling fractions of petroleum are divided into aromatic, naphthenic and paraffinic process oils, and all of which can be used in the present invention. A variety of aromatic process oils are commercially available under the trade names of Diana Process Oils AH-10 and AH-20 (products of Idemitsu Kosan Co., Ltd.); Mitsubishi Heavy Process Oils 34, 38, 39 and 44, and Mitsubishi Process Oils No. 1 and No. 2 (products of Mitsubishi Oil Co., Ltd.); Mobilsols K, 22 and 130J, and Pegaroids 501 and 571 (products of Mobil Sekiyu K.K.); Sonic Process Oils X-50, X-100 and X-140 (products of Kyodo Oil Co., Ltd.); Syntacs HA-25, HA-30 and HA-35 (products of Kobe Oil Chemical Co., Ltd.); Petrexes LOP-R, LPO-V, PF-1, PF-2, PA-1, PA-2, PA-3, PHA-1, PHA-2, PHA-3, F-1, F-2 and F-3 (products of Yamabun Oil Chemical Co., Ltd.); Komorex A Oil and Komorexes 300 and 700 (products of Nippon Oil Co., Ltd.); Shell Flexes LMO and 786JY (products of Shell Chemical K.K.); Shoseki Resolexes No. 1 and No. 3 (products of Showa Oil Co., Ltd.); Kygnus Process Oil A-300 (a product of Kygnus Sekiyu K.K.); JSO AROMA 790 (a product of Japan Sun Oil Co., Ltd.); Aromaxes #1, #3 and #5 (products of Fuji Kosan Co., Ltd.); Bearflexes LPO and MPO, and Califluxes RC, 510, LBL, GP, OSR, R-100, IT and 550 (products of Golden Bear Co., Inc.); Dutrexes 275, 298, 419, 739, 896, 1726 and 1786 (products of Shell Oil Co., Ltd.); Sundexes 790, 890, 8180 and 8125 (products of Sun Oil Co., Inc.); and the like.

Likewise, a variety of naphthenic process oils are commercially available under the trade names of Diana Process Oils KL-1, KL-40, KM-90, TM-55 and TM-85 (products of Idemitsu Kosan Co., Ltd.); Mitsubishi Light Process Oil and Mitsubishi Medium Process Oil (products of Mitsubishi Oil Co., Ltd.); Naplexes 38 and 32, and Pegaroids B, BB, 404 and TPD-705 (products of Mobil Sekiyu K.K.); Sonic Process Oils R-25, R-50, R-200, R-500, R-1000 and R-2000 (products of Kyodo Oil Co., Ltd.); Syntaxes NL-70 and N-60, and Strengthened Process Oil (products of Kobe Oil Chemical Co., Ltd.); Petrexes and PN-1 and PN-3 (products of Yamabun Oil Chemical Co., Ltd.); Komorex Process Oil No. 2 (a product of Nippon Oil Co., Ltd.); Shoseki Lipanoxes No. 1 and No. 2 (Showa Oil Co., Ltd.); Kygnus Process Oil N-200 (a product of Kygnus Sekiyu K.K.); F-Flex 1400N (a product of Fuji Kosan Co., Ltd.); Suwaflexes 100 and 200 (products of Maruzen Oil Co., Ltd.); Sunthenes 310, 410, 415, 420, 430, 250, 450, 380, 480, 2100, 3120, 4130, 4240 and 5600, and Circo Light R.P.O. (products of Sun Oil Co., Inc.); Cyclolubes NN-4, NN-3, NN-2, NN-1 and OSR (products of Golden Bear Co., Inc.); Shelfexes 212, 213, 371, 411, 732 and 790 (products of Shell Oil Co., Inc.); and the like.

Still likewise, a variety of paraffinic process oils are commercially available under the trade names of Diana Process Oils KL-2P, KL-4, MM-45, WP-65, WP-75 and WP-145 (products of Idemitsu Kosan Co., Ltd.); Mitsubishi 10 Light Process Oil and Mitsubishi 12 Medium Process Oil (products of Mitsubishi Oil Co., Ltd.); Sonic Process Oils P-200, P-300 and EPT 750 (products of Kyodo Oil Co., Ltd.); Syntacs PA-100 and PA-85 (products of Kobe Oil Chemical Co., Ltd.); Petrex HPO-150 (a product of Yamabun Oil Chemical Co., Ltd.); Kygnus Process Oil P-100 (a product of Kygnus Sekiyu K.K.); F-Flex 1150P, Process Oils P-200 and P-400 (products of Fuji Kosan Co., Ltd.); Suwaflex 4035 (a product of Maruzen Oil Co., Ltd.); Sunpars 107, 110, 115, 120, 130, 150, 180, 2100, 2180, 2210 and 2280 (products of Sun Oil Co., Inc.); and the like.

The term "liquid paraffin" as used herein denotes mixtures of high-purity saturated hydrocarbons in liquid form which are obtained by washing a light fraction of lubricating oil with sulfuric acid and thus purifying it to a high degree. Typical examples thereof include industrial liquid paraffin as described by JIS K2231 and liquid paraffin as describe by the Japanese Pharmacopoeia, both of which can be used in the present invention.

The above-defined flow improver is added in an amount of 4 to 10 parts by weight, preferably 4 to 30 parts by weight and more preferably 10 to 30 parts by weight, per 100 parts by weight of the combination of the polyolefin resin and the electrically-conductive carbon black. If the amount of flow improver added is less than 4 parts by weight, the flow properties of the resin can hardly be improved, while if it is greater than 40 parts by weight, the flow improver bleeds on the surface of the molded articles and thus impairs the adhesion properties of the plate formed thereon.

In preparing the electrically-conductive resin composition of the present invention, various ingredients can be mixed by means of any apparatus (for example, single-screw extruder, double-screw extruder or the like) that is commonly used in the art. In order to prevent thermal decomposition of the resin, the extrusion temperature should preferably be kept as low as possible. If desired, this resin composition may further contain commonly used additives for polyolefin resins, such as antioxidants, thermal stabilizers, anticorrosives, fillers, lubricants, blowing agents, flame retardants, and the like.

The resulting electrically-conductive resin composition can be formed into desired shapes according to various molding techniques such as injection molding, extrusion, compression molding, and the like.

In electroplating molded articles made of the electrically-conductive resin composition of the present invention, they are washed, for example, with a weakly-alkaline detergent and rinsed with water. Thereafter, the molded articles are first plated in a Watts bath under low-voltage conditions (for exaple, at 1 volt for 3 minutes, at 1.5 volts for 3 minutes, and the like), and then electroplated under ordinary conditions. More specifically, they may be sequentially plated with 3 $\mu$m of nickel strike, 10 $\mu$m of copper, 10 $\mu$m of nickel and 0.1 $\mu$m of chrome.

In contrast to prior art resin compositions for use in substrates to be plated, the improved electrically-conductive resin composition of the present invention shows no degradation in plate adhesion properties due to bleeding of the flow improver and, moreover, permits markedly increased design freedom of molded articles owing to its improved molding properties. These features of the electrically-conductive resin composition of the present invention are quite unexpected and probably attributable to its unique make-up including an electrically-conductive carbon black, sulfur and a plate adhesion promoter in large amounts.

The present invention is further illustrated by the examples below. In these examples, the melt index (hereinafter referred to as MI) of the resin composition was measured under a load of 10 kg according to ASTM D 1238. The adhesion strength of the plate formed on a substrate was determined by making a pair of parallel cuts with an interval of 1 cm, peeling a strip of the plate from the substrate at a rate of 30 mm/min, and measuring its peel strength with a peeling tester. The electric resistance of the resin composition was measured with a tester, the probes being disposed on the surface of the molded article with an interval of 1 cm.

EXAMPLES 1-7 AND COMPARATIVE EXAMPLES 1 AND 2

Into a Henschel mixer were charged Ethylene-Propylene Copolymer BJ4H (a product of Mitsui Toatsu Chemicals, Incorporated) as a polyolefin resin, acetylene black as an electrically-conductive carbon black, sulfur, a plate adhesion promoter as listed in Table I, and Diana Process Oil KL-40 (a product of Idemitsu Kosan Co., Ltd.) as a naphthenic process oil, in the proportions shown in Table I. In this table, the amounts sulfur, plate adhesion promoter, and flow improver added are given in parts by weight per 100 parts by weight of the combination of Ethylene-Propylene Copolymer BJ4H and acetylene black. After these ingredients were mixed, the resulting mixture was kneaded in an extruder and then pelletized. Using an injection molding machine, these pellets were formed into an 80 mm $\times$ 160 mm flat sheet of 2 mm thickness. The electric resistance of this sheet was measured. Then, the sheet was electroplated with nickel by placing it in a Watts bath containing 280 g/l of $Ni(SO_4)_2 \cdot 6H_2O$, 50 g/l of $NiCl_2 \cdot 6H_2O$, and 45 g/l of boric acid and having a pH value of 4.2 and applying a direct current at a current density of 1 $A/dm^2$ for 5 minutes. Subsequently, the sheet was electroplated with copper by placing it in a copper plating bath containing 220 g/l of $Cu(SO_4)_2 \cdot 5H_2O$ and 55 g/l of $H_2SO_4$ and applying a direct current at a current density of 2.8 $A/dm^2$ for 90 minutes to form a 50 $\mu$m thick layer of copper. The resulting plated specimen was used to measure the adhesion strength of the deposited copper layer. In order to examine its surface conditions, the specimen was further electroplated with nickel at a current density of 4 $A/dm^2$ and then with chrome at a current density of 20 $A/dm^2$.

The MI, plate adhesion strength and electric resistance of several resin compositions were measured in the above-described manner, and the results thus obtained are shown in Table I.

For purposes of comparison, the same procedure was repeated with two resin compositions in which the amount of flow improver used was less or greater than the specified range (Comparative Examples 1 and 2). The results thus obtained are also shown in Table I.

EXAMPLE 8

The procedure of Example 1 was repeated except that 5 parts by weight of polyethylene glycol having a mean molecular weight of 1,500 was used in place of the Diana Process Oil KL-40. The results thus obtained are shown in Table II.

EXAMPLE 9

The procedure of Example 1 was repeated except that 5 parts by weight of polypropylene glycol (Diol-1000; a product of Mitsui Toatsu Chemicals, Incorporated) was used in place of the Diana Process Oil KL-40. The results thus obtained are shown in Table II.

EXAMPLES 10 AND 11

The procedure of Example 1 was repeated except that 10 or 20 parts by weight of liquid paraffin (Gloria; a product of Shima Trading Co., Ltd.) was used in place of the Diana Process Oil KL-40. The results thus obtained are shown in Table II.

EXAMPLE 12

The procedure of Example 1 was repeated except that 20 parts by weight of Aromax #1 (a product of Fuji Kosan Co., Ltd.) as an aromatic process oil was used in place of the Diana Process Oil KL-40. The results thus obtained are shown in Table II.

EXAMPLE 13

The procedure of Example 1 was repeated except that 20 parts by weight of Kygnus Process Oil P-100 (a product of Kygnus Sekiyu K.K.) as a paraffinic process oil was used in place of the Diana Process Oil KL-40. The results thus obtained are shown in Table II.

COMPARATIVE EXAMPLES 3-7

Into a Henschel mixer were charged Ethylene-Propylene Copolymer BJ4H (MI 20; a product of Mitsui Toatsu Chemicals, Incorporated) as a polyolefin resin, acetylene black as an electrically conductive carbon black, sulfur, and a plate adhesion promoter as listed in Table III (and no flow improver), in the proportions shown in Table III. Thereafter, the procedure of Example 1 was followed. The results thus obtained are shown in Table III.

TABLE I

| | Unit | Comparative Example 1 | Comparative Example 2 | Example 1 | Example 2 | Example 3 | Example 4 | Example 5 | Example 6 | Example 7 |
|---|---|---|---|---|---|---|---|---|---|---|
| Ethylene-Propylene Copolymer BJ4H | % | 67 | 67 | 67 | 67 | 67 | 67 | 67 | 67 | 67 |
| Acetylene black | % | 33 | 33 | 33 | 33 | 33 | 33 | 33 | 33 | 33 |
| Sulfur | parts by weight | 0.7 | 0.7 | 0.7 | 0.7 | 0.7 | 0.7 | 0.7 | 0.7 | 0.7 |
| Mercaptobenzothiazole | " | 0.7 | 0.7 | 0.7 | 0.7 | 0.7 | | | | |
| Dibenzothiazyl disulfide | " | | | | | | 0.7 | | | |
| Zinc diethyl dithiocarbamate | " | | | | | | | 0.7 | | |
| Trithiolcyanuric acid | " | | | | | | | | 0.7 | |
| 3,4,5,6-Tetrachloronenzene-1,2-dithiol | " | | | | | | | | | 0.7 |
| Diana Process Oil KL-40 [3] | " | 3 | 50 | 5 | 20 | 40 | 20 | 20 | 20 | 20 |
| MI | g/10 min | 0.4 | 54 | 0.8 | 24 | 40 | 24 | 22 | 24 | 22 |
| Electric resistance | Ω | 5 | 16 | 5 | 8 | 14 | 8 | 8 | 9 | 8 |
| Plate adhesion strength | kg/cm | 1.8 | 1.3 | 1.8 | 1.8 | 1.7 | 1.8 | 1.9 | 2.5 | 2.9 |
| Appearance of plated specimen | | [1] | [2] | Good | Good | Good | Good | Good | Good | Good |

Notes:
[1] The surface presented a ripply and hence somewhat poor appearance.
[2] Some bleeding of the process oil was noted on the surface of the injection-molded sheet.
[3] This is a naphthenic process oil manufactured by Idemitsu Kosan Co., Ltd.

TABLE II

| | Unit | Example 8 | Example 9 | Example 10 | Example 11 | Example 12 | Example 13 |
|---|---|---|---|---|---|---|---|
| Ethylene-Propylene Copolymer BJ4H | % | 67 | 67 | 67 | 67 | 67 | 67 |
| Acetylene black | % | 33 | 33 | 33 | 33 | 33 | 33 |
| Sulfur | parts by weight | 0.7 | 0.7 | 0.7 | 0.7 | 0.7 | 0.7 |
| Mercaptobenzothiazole | " | 0.7 | 0.7 | 0.7 | 0.7 | 0.7 | 0.7 |
| Polyethylene glycol | " | 5 | | | | | |
| Polypropylene glycol | " | | 5 | | | | |
| Liquid paraffin (Gloria) | " | | | 10 | 20 | | |
| Aromax #1 [1] | " | | | | | 20 | |
| Kygnus Process Oil P-100 [2] | " | | | | | | 20 |
| MI | g/10 min | 3 | 1.0 | 5 | 30 | 15 | 20 |
| Electric resistance | Ω | 5 | 5 | 8 | 8 | 10 | 10 |
| Plate adhesion strength | kg/cm | 1.8 | 1.8 | 1.8 | 1.8 | 1.8 | 1.8 |
| Appearance of plated specimen | | Good | Good | Good | Good | Good | Good |

Notes:
[1] This is an aromatic process oil manufactured by Fuji Kosan Co., Ltd.
[2] This is a paraffinic process oil manufactured by Kygnus Sekiyu K.K.

TABLE III

| | Unit | Comparative Example 3 | Comparative Example 4 | Comparative Example 5 | Comparative Example 6 | Comparative Example 7 |
|---|---|---|---|---|---|---|
| Ethylene-Propylene Copolymer BJ4H | % | 67 | 67 | 67 | 67 | 67 |
| Acetylene black | % | 33 | 33 | 33 | 33 | 33 |
| Sulfur | parts by weight | 0.7 | 0.7 | 0.7 | 0.7 | 0.7 |
| Mercaptobenzothiazole | " | 0.7 | | | | |
| Dibenzothiazyl disulfide | " | | 0.7 | | | |
| Zinc diethyl dithiocarbamate | " | | | 0.7 | | |

TABLE III-continued

| | Unit | Comparative Example | | | | |
| --- | --- | --- | --- | --- | --- | --- |
| | | 3 | 4 | 5 | 6 | 7 |
| Trithiolcyanuric acid | " | | | | 0.7 | |
| 3,4,5,6-Tetrachlorobenzene-1,2-dithiol | " | | | | | 0.7 |
| MI | g/10 min | 0.3 | 0.3 | 0.3 | 0.3 | 0.3 |
| Electric resistance | Ω | 5 | 5 | 5 | 5 | 5 |
| Plate adhesion strength | kg/cm | 1.8 | 1.8 | 1.8 | 2.5 | 3.0 |
| Appearance of plated specimen | | [1] | [1] | [1] | [1] | [1] |

Note:
[1] The surface presented a ripply and hence poor appearance and, therefore, had no commercial value.

What is claimed is:

1. In an electrically conductive resin composition, suitable for electroplating, comprising (a) 100 parts by weight of a polyolefin resin selected from the group consisting of homopolymers of ethylene, homopolymers of propylene, copolymers of ethylene and propylene, copolymers of ethylene with other alphaolefins, copolymers of propylene with other alpha-olefins, and mixtures thereof, (b) 0.1–10 parts by weight of sulfur, (c) 0.05–10 parts by weight of a plate adhesion promoter and (d) 10–70 parts by weight of an electrically conductive carbon black, the improvement which comprises adding to said composition a flow improver in an amount of 4–40 parts by weight per 100 parts by weight of (a) plus (d), said flow improver being selected from the group consisting of a softening agent derived from petroleum, a polyalkylene glycol and mixtures thereof, said softening agent being derived from petroleum which consists of naphthenic process oil, aromatic process oil, paraffinic process oil or liquid paraffin, said polyalkylene glycol having alkylene radicals of 1 to 4 carbon atoms.

2. The composition of claim 1, wherein said flow improver is present in an amount of 4–30 parts by weight per 100 parts by weight of (a) plus (d).

* * * * *